(No Model.) 5 Sheets—Sheet 1.

T. L. SMITH & W. S. DOIG.
BOX NAILING MACHINE.

No. 342,230. Patented May 18, 1886.

Witnesses:
Louis M. Whitehead.
M. Henthorn

Inventors:—
Thomas L. Smith
William S. Doig
By their attorney
W Colborne Brookes (No Model.) 5 Sheets—Sheet 2.

T. L. SMITH & W. S. DOIG.
BOX NAILING MACHINE.

No. 342,230. Patented May 18, 1886.

Witnesses:
Louis M. F. Whitehead.
M. Henthorn

Inventors:—
Thomas L. Smith
William S. Doig
by their attorney
W. Colborne Brookes (No Model.) T. L. SMITH & W. S. DOIG. 5 Sheets—Sheet 3.
BOX NAILING MACHINE.
No. 342,230. Patented May 18, 1886.
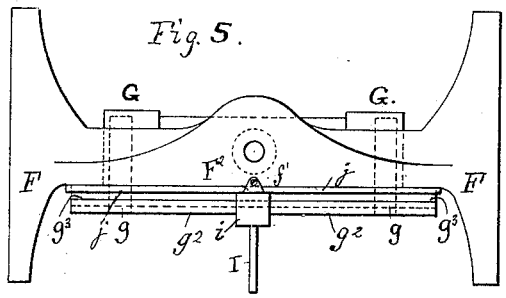
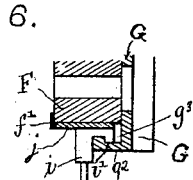
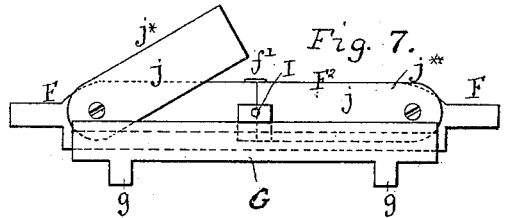
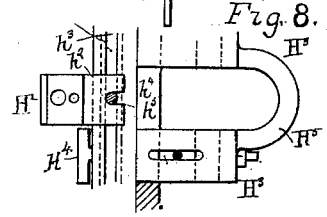
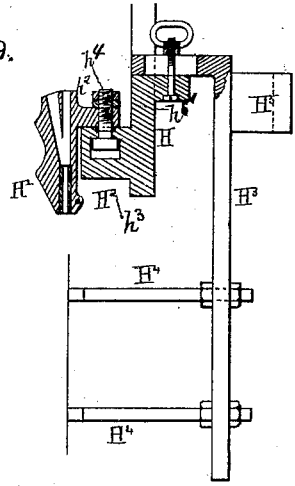
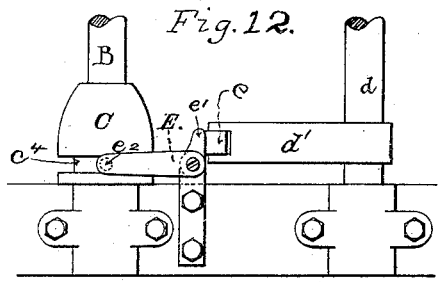
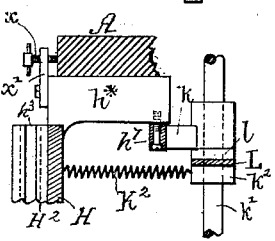
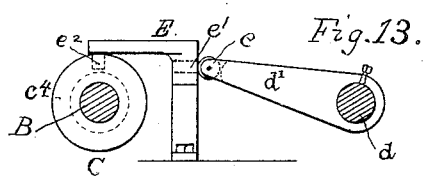
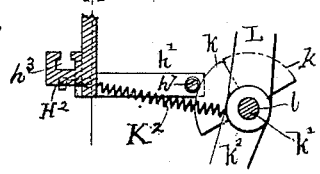
Witnesses:
Louis M. F. Whitehead.
M. Henthorn
Inventors:—
Thomas L. Smith
William S. Doig
by their attorney
W. Colborne Brokas
N. PETERS, Photo-Lithographer, Washington, D. C.

(No Model.)   T. L. SMITH & W. S. DOIG.   5 Sheets—Sheet 4.
BOX NAILING MACHINE.

No. 342,230.   Patented May 18, 1886.

Witnesses:   Inventors,
Thomas L. Smith
William S. Doig
by their attorney
W. Colborn Brookes (No Model.) 5 Sheets—Sheet 5.

T. L. SMITH & W. S. DOIG.
BOX NAILING MACHINE.

No. 342,230. Patented May 18, 1886.

Witnesses.
Geo. W. Foy.
Chas. A. Miller

Inventors
Thomas L. Smith
William S. Doig
by their attorney
W. Colborne Brookes

United States Patent Office.

THOMAS L. SMITH AND WILLIAM S. DOIG, OF BROOKLYN, NEW YORK; SAID SMITH ASSIGNOR TO SAID DOIG.

BOX-NAILING MACHINE.

SPECIFICATION forming part of Letters Patent No. 342,230, dated May 18, 1886.

Application filed January 14, 1884. Serial No. 117,566. (No model.)

*To all whom it may concern:*

Be it known that we, THOMAS L. SMITH and WILLIAM S. DOIG, citizens of the United States, both residing at Brooklyn, in the county of Kings and State of New York, have invented certain new and useful Improvements in Box-Nailing Machines, of which the following is a specification.

Our invention relates to improvements in box-nailing machines, whereby greater facility for the insertion of the nails at any desired point or series of points is secured.

Our invention further relates to improvements in the means of holding and retaining the punches in the cross-heads so that the same may be individually removed from the cross-head without displacing or disturbing any of the others of the series.

The invention also relates to improvements in the means of holding the nail-boxes in such manner that each nail-box may be readily removed without reference to the remainder of the series.

The main framing of the machine is formed in one piece and bolted to the base or foundation plate.

The machine is started by a tripping arrangement operated by a treadle, and is stopped automatically just as the cross-head is returned after making a stroke.

Our invention also relates to various details of the machine, the whole of which will be described by the accompanying specification and claims, and the drawings annexed, which form part of the same.

Figure 1:
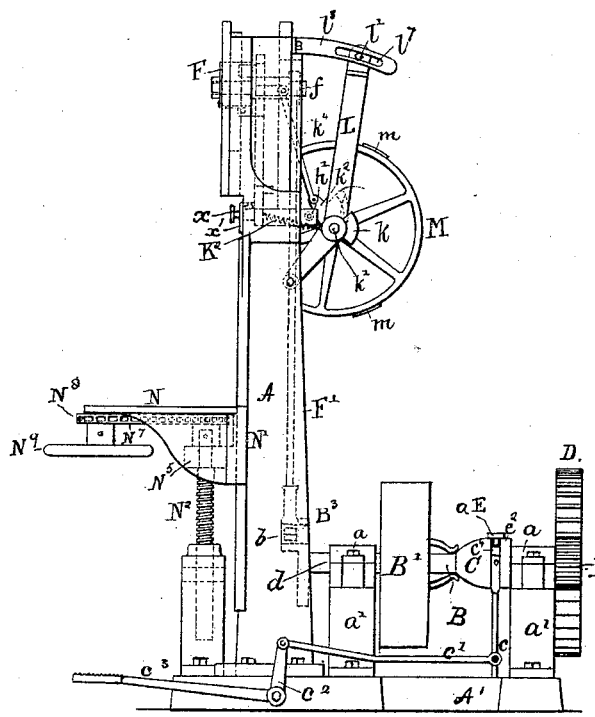
Figure 2:
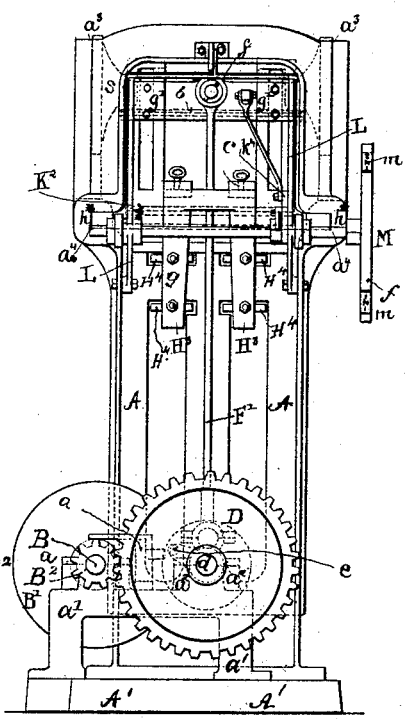
Figure 15:
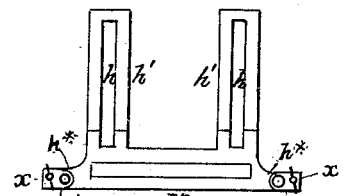
Figure 14:
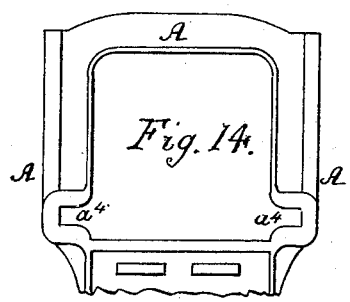
Figure 3:
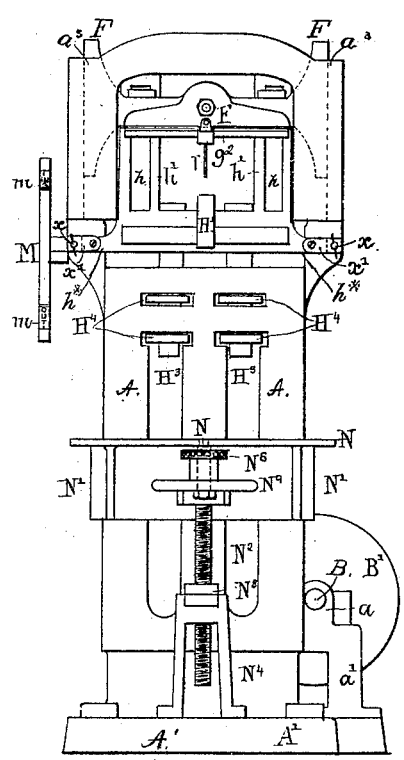
Figure 4:
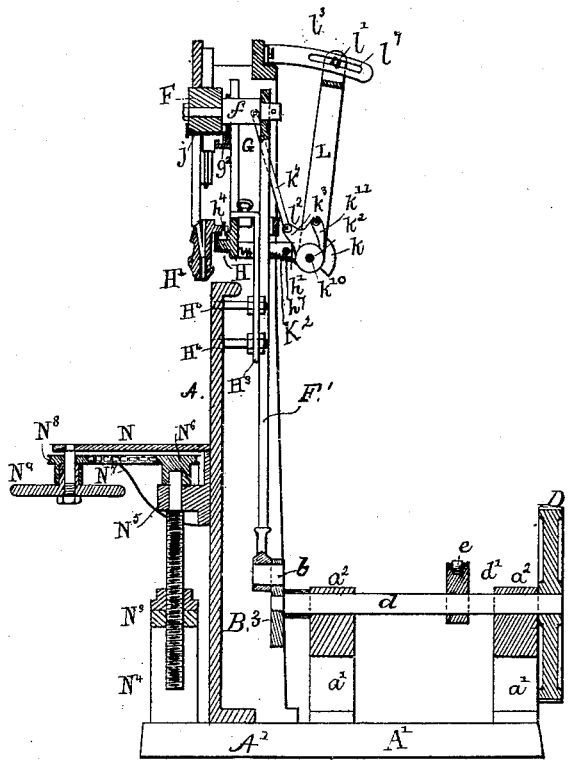
Figure 17:
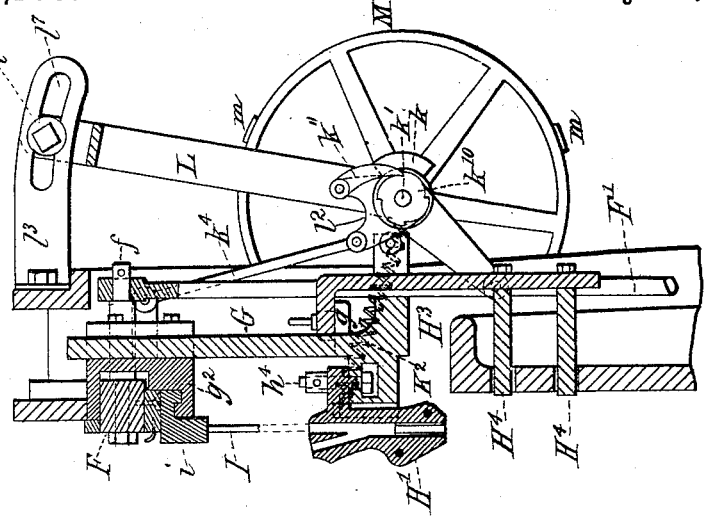
Figure 16:
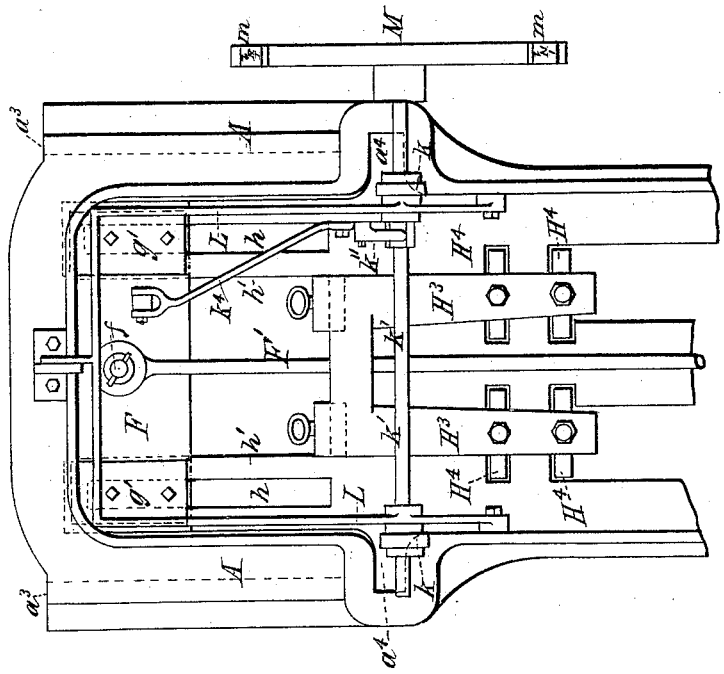
Figure 19:
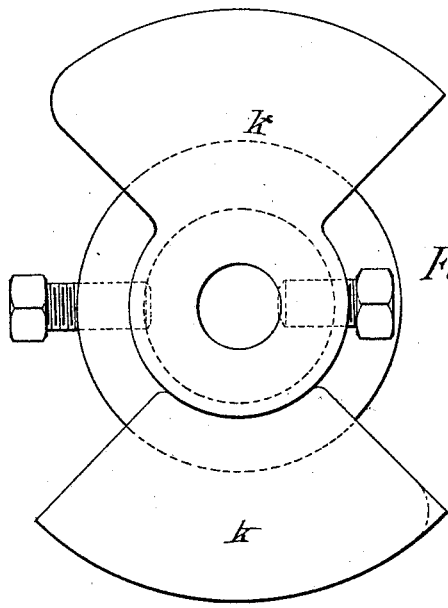
Figure 20:
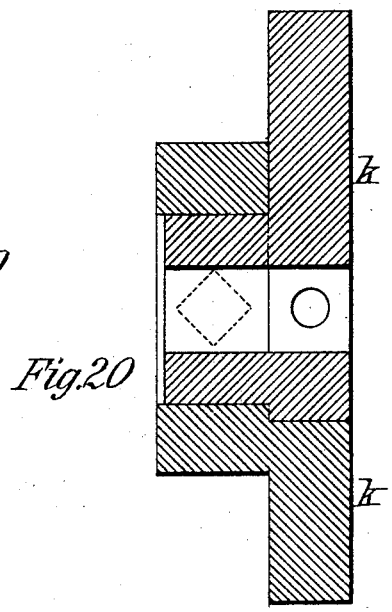
Figure 18:
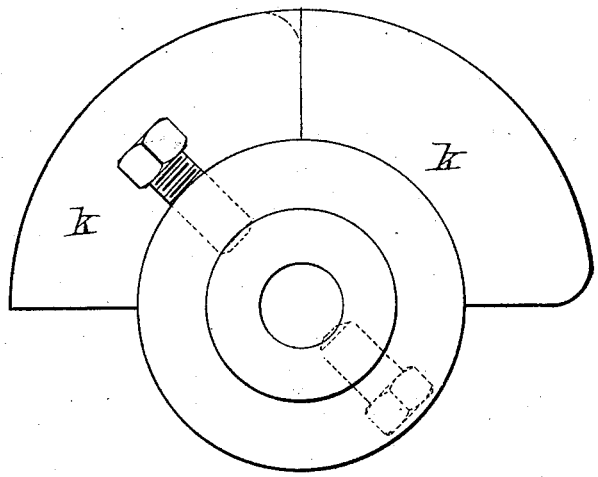

Referring to the drawings, Figure 1 is a side elevation, Fig. 2 a back view, Fig. 3 is a front view, and Fig. 4 a central vertical section, of our improved machine. Figs. 5 to 13, inclusive, show detail views of parts on a larger scale. Fig. 5 is a front view of the cross-head frame with one punch in position. Fig. 6 is a section through the center of Fig. 5. Fig. 7 is an under side view of Fig. 5. Fig. 8 is a plan, and Fig. 9 a vertical section, of the nail-box frame and parts immediately connected therewith. Fig. 10 is a partial plan, and Fig. 11 a partial side view, of parts immediately connected with the nail-box frame. Fig. 12 is a plan, and Fig. 13 a section, of the tripping mechanism for throwing the clutch out of contact and stopping the machine. Fig. 14 is a separate view of the upper part of the main framing separately. Fig. 15 is a detached view of the nail-box frame and parts immediately connected therewith. Fig. 16 is an enlarged diagram of the upper part of Fig. 2. Fig. 17 is an enlarged diagram of the upper part of Fig. 4. Figs. 18, 19, and 20 are enlarged views of the cams. Fig. 18 is a front view of the cams in the position shown by Fig. 11. Fig. 19 represents the cams in position to operate the frames "in" and "out" alternately. Fig. 20 is a sectional end view of the cams in the position shown by Fig. 19.

In each of the views similar letters of reference are employed to indicate corresponding parts wherever they occur.

A A represent the main framing, and A' the base or bed plate.

B is the main or driving-shaft, which is supported in bearings $a\ a$, supported in brackets or standards $a'\ a'$, bolted to the base or bed plate A'.

Motion is communicated to the main shaft by means of a driving-pulley, B', which runs freely on the main shaft B, except when connected thereto by the clutch C, (shown separately in Fig. 12,) and which I prefer to be of the description known as "Frisbie's Clutch," which is operated by means of a series of levers, $c\ c'\ c^2$, (see Fig. 1,) operated by preference by a treadle-lever, $c^3$, (see Fig. 1,) in position to be actuated by the foot of the operator when it is desired to connect the driving-pulley B' with the shaft B to drive the machine.

Upon the shaft B is also mounted a gear-wheel, $B^2$, which takes into and drives a larger gear-wheel, D, (see Figs. 1 and 2,) mounted on the end of a shaft, $d$, revolving in bearings $a^2$, formed on or affixed to the standards or brackets $a'$.

Upon the shaft $d$ is mounted an arm or lever, $d'$, (see Figs. 4, 12, and 13,) on the outer end of which is formed or applied a bearing-surface or anti-friction roller $e$, (shown in Fig. 4, and on a larger scale in Figs. 12 and 13,) adapted at each revolution of the shaft $d$ to come into contact with a dog or projection, $e'$, forming the short arm of an L-lever, E, Figs. 1, 12, and 13, on the outer end of which is applied a projection or an anti-friction roller, $e^2$, Figs. 1, 12, and 13, working in a groove or slot, $c^4$, formed in the friction-clutch C, the object of the projection or anti-friction pulley $e^2$ being to throw the clutch out of contact with the pulley B' at each revolution of the shaft $d$ just at the time that the cross-head F has effected a stroke, as hereinafter more fully described, for the purpose of inserting a nail or series of nails in the side, end, or other portion of a box.

The cross-head F is supported with capability of sliding vertically in grooves or channels $a^3$, formed in the upper end of the framing A. (See Figs. 2 and 3.)

Motion is communicated to the cross-head F by means of a connecting-rod, F', (shown clearly in Figs. 1, 2, and 4,) the lower end of which is connected to a pin or stud, $b$, formed on or affixed to an eccentric, $B^3$, keyed or otherwise attached to the shaft $d$, while its upper end is connected to a pin or stud, $f$, formed on or affixed to the center of the rear of the cross-head F.

At the rear of the cross-head F is arranged a frame, G, formed or provided with extensions $g\ g$, adapted to slide freely in vertical slots $h\ h$, formed in standards $h'\ h'$, (see Fig. 3,) forming part of the nail-box frame H, which on each side is formed or provided with lateral extensions $h^*\ h^*$, (see Figs. 10 and 15,) adapted to be received and slide freely in grooves or bearings $a^4$, formed in the opposite sides of the main frame A. (See Fig. 14.)

The punch-holding frame G is held in position by means of plates $g'\ g'$, (shown in Figs. 2 and 16,) applied to the rear of the extensions $g\ g$, and secured by bolts or otherwise in such manner as to prevent the frame G getting out of position.

On the under side of the frame G we form an extension, $g^2$, (see Figs. 5 and 6,) in the upper surface of which we construct a groove or channel, $g^3$, adapted to receive the hooked ends $i'$ of the heads $i$ of the punches I. The hooked ends $i'$ of the heads $i$ of the punches I are formed flat both on their upper and lower surfaces, and they are retained in position, in the extension $g^2$ by means of a plate or plates, $j$, (see Figs. 6 and 7,) pivoted at one end to the under side of the front extension, $F^2$, of the cross-head F, while its opposite end is held in position when desired by a turn-button, $f'$, or other suitable retaining device.

When it is desired to place a punch or punches, I, in position or remove the same, the plate or plates $j$ are turned into the position shown at $j^*$, Fig. 7, thereby leaving a space between the under side of the extension $F^2$, to allow of the raising of the heads $i$ sufficiently to allow of their hooked ends $i'$ passing freely to or from the channel $g^3$ in the extension $g^2$. (See Figs. 6 and 7.) When the punch or punches I have been placed in position, the plate or plates $j$ are turned into the position shown by Figs. 5 and 6, and at $j^{**}$ in Fig 7, when the punches will be held firmly in the desired position.

H' represents one of the nail-boxes, of which there may be any number corresponding to the number of punches I employed and the size and number of nails to be driven at any time by the machine. The nail-boxes H' are formed on their rear faces with extensions $h^2$, which are formed on their under sides with projections adapted to rest in the upper portion of an inverted-T-groove, $h^3$, extending across the upper surface of an extension, $H^2$, formed on the front face of the nail-box frame H, as shown clearly by Figs. 8 and 9.

$h^4$ are bolts, the heads of which are slid into the lower or wider portion of the inverted-T-groove, with their shanks extending upward, as shown clearly by Fig. 9, in position to pass through notches or recesses $h^5$ (see Fig. 8) in the extensions $h^2$ of the the nail-boxes H'.

$h^6$ are check-nuts for the purpose of tightening the screw-bolts when the nail-boxes are arranged in position. (See Fig. 9.)

At the rear of the nail-box frame H are arranged pendent supports $H^3$, to which are connected by screw-nuts pairs of guide-stops $H^4$ $H^4$, for regulating the position of the end or side of the box for the time being formed. The pendent supports $H^3$ are preferably connected together by curved connecting-pieces $H^5$, as shown by Figs. 8 and 9.

In order to move the nail-box frame H and the frame G automatically to and fro when desired to regulate the positions at which the nails shall be inserted, we form on the lateral extensions, $h^*\ h^*$, projections or friction-rollers $h^7$, (see Figs. 4, 10, and 11,) adapted to engage with the surfaces of a pair of cams, $k$, mounted on a shaft, $k'$, which is supported in bearings $l\ l$, formed in or affixed to adjustable pivoted rods or bars L L, each of which at its upper end is pivoted to adjustable bolts or bearings $l'$, held in segmental grooves $l^3\ l^3$, formed in arms or extensions $l^3\ l^3$, supported at the rear of the framing A. The shaft $k'$ is revolved by means of a ratchet-wheel, $k^{10}$, the teeth of which (represented simply by a circle in Fig. 4, but shown distinctly by the large diagram, Fig. 17) are taken into by a pawl, $k^{11}$, mounted on a swinging lever or plate, $l^2$, working freely on the shaft $k'$, and provided at its extension with a pin or bolt, to which is pivoted the lower end of a bent rod, $k^4$, the upper end of which is hinged to the rear of the punch-frame or cross-head F in such manner that at each upward movement of the punch-frame or cross-head F the pawl $k^{11}$ will cause the ratchet $k^{10}$, and consequently the shaft $k'$, to make a partial revolution, thereby changing the position of the cams $k$, mounted thereon, the object of the cams $k$ being to force the frame H, with the nail-boxes, the pendents $H^3$, and the guide-stops $H^4$ forward to the desired extent to bring the nail-boxes into the proper position in relation to the end or side of the box being made, so that the nails shall be driven into the center of the width thereof.

The frame H and its connected parts are driven forward, when desired by means of the cams $k$ $k$, and it is brought back when released from the cams $k$, by means of a spring or springs, $K^2$, one end of which is connected to the frame H, while the opposite end is attached to a collar, $k^3$, carried by the shaft $k'$.

Upon the outer end of the shaft $k'$ is mounted an index-wheel, M, on the periphery of which, at equal distances apart, are arranged figures, letters, or symbols indicating the position of the cams $k$. We have in Figs. 2, 3, and 16 of the drawings supposed four sets of letters arranged on the following order: "In 1," "Out 1," "In 2," "Out 2." This may, however, be varied, and the said letters, figures, or symbols we prefer to apply on adjustable plates $m$, so that their position or number may be readily varied. By "In 1" we mean that the frame and its parts have been pushed forward by the cam $k$ once to an extent adapted to bring the parts into position for nailing the first side of a box-frame with the end flush with the sides. By "Out 1" we mean that the frame and its parts have been pushed forward once a sufficient distance to nail the end of a box-frame of greater thickness, or which is intended for a box having a recessed end adapted for the reception and protection of labels or other advertising designs or distinguishing-marks, and consequently requiring the nails to be inserted at a greater distance from the end of the side. By "In 2" and "Out 2" we mean that the respective operations have been repeated. The object of thus indicating the position of the parts at the last operation of nailing is to avoid mistakes on starting the machine, particularly when employing new or inexperienced hands.

The extent to which the frame H and its connected parts are pushed forward is regulated by the surface of the cams $k$. When the enlarged surface is presented, the parts will be brought into position to nail "out," and, vice versa, when the smaller portion or boss or bosses of the cams $k$ are brought into position to face the friction-pulleys $h^7$ on the extensions $h^*$ of the frame H, the springs $k^2$ will draw the frame H and bring the parts into such position that the machine will nail "in."

The order in which the times of nailing "in" or "out" may be regulated at will by changing the order and number of the extensions or depressions of the cams $k$ or their extent of surface. If the extensions are one-quarter of the circumference and the depressions three-quarters of the circumference, the machine will nail "out" once and "in" three times, and then again "out" once, and so on. By extending the enlarged portion to half the circumference, as shown by Fig. 11, the machine will alternately nail "out" twice and then "in" twice. If the projections and undulations were alternated, the machine would alternately nail "in" and "out." It will thus be readily seen that when a nail or series of nails is desired to be driven through a box bottom or side at a distance from the end of such bottom or side, so as to bring the said nail or nails into the center of a thick piece of wood or a piece of wood arranged at a distance from the end of the box bottom or side, the cams are arranged to bring the frame F, carrying the nail-box and punches, into position to drive the nails into the material at the desired point or points, while the ends or sides are held in position by the guide-stops $H^4$, which are protruded over the surface of the table N or drawn flush with the face of the framing A, as desired. If they are protruded, the box will be formed with an end or side countersunk; but if they are flush with the framing A a smooth rectangular box will be formed.

The extent to which the frame H and its connected parts may be pushed forward is further regulated by adjusting the position of the bolts $l'$ of the pivoted rods or bars L L in the segmental grooves $l'$ $l'$, and consequently the position of the shaft $k'$ and its cams $k$ $k$.

The extent to which the frames can be drawn backward is regulated by thumb-screws or other equivalent stops $x$, supported in or by bearings $x'$, attached to the lateral extensions $h^*$ $h^*$ of the nail-box frame, as shown by Figs. 3 and 10. The stops $x$ at each backward movement of the frames come against the framing A and insure the proper position of the nail-boxes H and punches I in position to the center of the end or other portion to be nailed when such portion is narrow or all portions are of the same thickness.

N is the table-support for the box or boxes to be nailed. This table N is provided with flanges or other suitable guides, N', to keep it in proper position laterally in relation to the framing A, and is controlled vertically in position by means of a screw, $N^2$, supported with capability of free revolution in a block, $N^3$, carried by the standard $N^4$. At its upper end the screw $N^2$ is turned down, so as to be capable of free rotation in a bearing, $N^5$, formed on or affixed beneath the table N.

To the upper end of the screw $N^2$ we connect a chain-wheel, $N^6$, around which passes a chain, $N^7$, which also passes round a chain-wheel, $N^8$, mounted on a spindle carried by the under front of the table N.

On the under side of the chain-wheel $N^8$ is formed or affixed a hand-wheel, $N^9$, in position to be within easy reach of the hands of the workman tending the machine. By turning the hand-wheel $N^9$ in one direction or the other by means of the chain-wheels $N^6$ $N^8$ and chain $N^9$ the screw will be turned so as to raise or lower the table N, and adjust the same to the size of box desired to be nailed.

The nails are supplied to the nail-boxes H' by means of apparatus such as described in our Letters Patent No. 276,369, dated May 1, 1883, or by any other suitable mechanism. We can also employ any other suitable clutch in place of the Frisbie clutch shown in the drawings.

Having thus described our invention, what we claim, and desire to secure by Letters Patent, is—

1. In a box-nailing machine, as described, the combination, with a punch-holding frame, as G, and with a punch-carrying cross-head, as F, of a nail-box frame, as H, and cams, as $k$, operated from the cross-head, and having connections whereby the frames and their operating parts are brought into any designated or desired position, as set forth.

2. In a box-nailing machine, as described, the combination, with a punch-holding frame, as G, and a nail-box frame, H, as described, of a punch-carrying cross-head reciprocating in vertical guides, a cam-shaft having interchangeable cams and connections, as $k^4 k^{11} k^{10}$, whereby said cams are operated from the cross-head, as set forth.

3. The combination, with the frames G H, cam-shaft $k'$, and cams $k$, of the adjustable bars L, ratchet $k^{10}$, pawl $k^{11}$, and bent rod $k^4$, hinged to the cross-head, as and for the purposes set forth.

4. In a box-nailing machine, the combination, with the cross-head F and means for reciprocating it, of detachable punches I, having hooked ends $i'$, and pivoted plates arranged to release said punches or lock them to the cross-heads at will, as set forth.

5. In a box-nailing machine, as described, the combination, with the frame H and its adjustable nail-boxes H', of the cams $k$, the set-screws $x$, and the springs $k^2$, all arranged for joint operation as set forth.

6. In a box-nailing machine, as described, the combination, with the frame H, having extensions $h^x$, and with guides $a^4$ in frame A, of the cams $k$, and the controlling-screw $x$, and lug $x'$, as and for the purposes set forth.

7. The combination of the nail controlling and driving mechanism with the lever $k^4$, ratchet device $k^2 k^{11}$, cams $k$, shaft $k'$, adjustable pivoted rods L L, and a rod guide or guides, $l^3$, substantially as shown and described.

8. In a box-nailing machine, the combination of a nail-box frame provided with a slotted extension, $H^2$, with the independently-adjusted nail-boxes H', bolts $h^4$, and a check-nut or check-nuts, $h^{6'}$, substantially as shown and described.

9. The combination, with the punch-holding frame and an independently-detachable punch or series of punches, of a removable locking plate or plates, $j$, adapted when desired to come between a surface of the cross-head and the head or heads of the punch or punches, substantially as and for the purpose described.

10. In a box-nailing machine, the combination of a punch-holding frame formed with a slotted or grooved extension, with one or more punches, I, with corresponding hook-shaped heads $i$, and a removable locking plate or plates, $j$, substantially as shown and described.

11. The combination, with the shaft B and crank and pitman connection with the reciprocating cross-head F, of said cross-head, a pulley mounted on said shaft B, a shaft arranged parallel with the shaft B and geared therewith, an arm mounted on said auxiliary shaft, and a clutch, as C, and an elbow-lever, E, arranged in the path of the arm on the auxiliary shaft to throw the clutch out of gear at each revolution of the said shaft and at each complete stroke of the cross-head, as set forth.

12. The combination of a box-holding table or support of a box-nailing machine with the adjustable screw-support $N^2$, chain-wheels $N^6 N^8$, chain $N^7$, and hand-wheel $N^9$, the whole being arranged and constructed to operate substantially as shown and described.

13. In a box-nailing machine, the combination, with the cam-operating shaft $k'$ and a cam or cams, $k$, of an index-wheel, M, substantially as and for the purpose described.

14. In a box-nailing machine, the combination of the cam-operating shaft $k'$ and a cam or cams, $k$, with an index-wheel, M, provided with removable indicating-plates $m$, substantially as and for the purpose described.

15. In a box-nailing machine, as described, the combination, with the frame H, having T-groove $h^3$, and with nail-boxes H', bolts $h^4$, and set-nuts $h^{6'}$, of the pendant $H^3$, having guide stops $H^4$ and curved connecting-pieces $H^5$, as and for the purposes set forth.

In witness whereof we have hereunto set our hands this 26th day of December, 1883.

THOS. L. SMITH.
WILLIAM S. DOIG.

Witnesses:
GEO. M. PAYNTAR,
THEO. L. C. HOWE.